US012744200B2

(12) United States Patent
Sun et al.

(10) Patent No.: US 12,744,200 B2
(45) Date of Patent: Sep. 22, 2026

(54) LITHIUM-ION BATTERY, BATTERY MODULE, BATTERY PACK, AND POWER CONSUMPTION APPARATUS

(71) Applicant: Contemporary Amperex Technology (Hong Kong) Limited, Hong Kong (CN)

(72) Inventors: Xin Sun, Ningde (CN); Xuan Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 631 days.

(21) Appl. No.: 18/448,907

(22) Filed: Aug. 12, 2023

(65) Prior Publication Data

US 2023/0395776 A1 Dec. 7, 2023

Related U.S. Application Data

(63) Continuation of application No. PCT/CN2022/074647, filed on Jan. 28, 2022.

(51) Int. Cl.

| | |
|---|---|
| ***H01M 4/583*** | (2010.01) |
| ***H01M 4/133*** | (2010.01) |
| ***H01M 4/36*** | (2006.01) |
| ***H01M 4/587*** | (2010.01) |
| ***H01M 10/0525*** | (2010.01) |
| *H01M 4/02* | (2006.01) |

(52) U.S. Cl.

CPC ........... *H01M 4/133* (2013.01); *H01M 4/366* (2013.01); *H01M 4/587* (2013.01); *H01M 10/0525* (2013.01); *H01M 2004/021* (2013.01); *H01M 2004/027* (2013.01); *H01M 2220/20* (2013.01)

(58) Field of Classification Search

CPC .............................................. H01M 4/58–587

See application file for complete search history.

(56) References Cited

U.S. PATENT DOCUMENTS

2013/0309573 A1 11/2013 Toshio et al.

FOREIGN PATENT DOCUMENTS

| | | | | |
|---|---|---|---|---|
| CN | 103427074 A | | 12/2013 | |
| CN | 110010852 A | | 7/2019 | |
| CN | 110190287 A | | 8/2019 | |
| CN | 111129504 A | | 5/2020 | |
| CN | 111599983 A | * | 8/2020 | .......... H01M 10/052 |
| CN | 111916682 A | | 11/2020 | |
| CN | 113437253 A | | 9/2021 | |

OTHER PUBLICATIONS

Abe, Effect of negative/positive capacity ratio, Journal of Energy Storage (Year: 2018).*

(Continued)

*Primary Examiner* — Allison Bourke
*Assistant Examiner* — Louise James Iannucci
(74) *Attorney, Agent, or Firm* — ANOVA LAW GROUP, PLLC

(57) ABSTRACT

A lithium-ion battery includes a negative electrode including a current collector, a lithiophilic layer, a main body layer, and a lithiophobic layer laminated in sequence. A ratio of a discharge negative electrode capacity to a discharge positive electrode capacity of the lithium-ion battery is less than 1.

9 Claims, 2 Drawing Sheets

(56) References Cited

OTHER PUBLICATIONS

Ma, Janus-faced graphene substrate stabilizes lithium metal anode, Chemical Engineering Journal (Year: 2021).*

The World Intellectual Property Organization (WIPO) International Search Report and Written Opinion for PCT/CN2022/074647 Oct. 25, 2022 17 pages (including English translation).

* cited by examiner

LITHIUM-ION BATTERY, BATTERY MODULE, BATTERY PACK, AND POWER CONSUMPTION APPARATUS

CROSS-REFERENCE TO RELATED APPLICATION

This application is a continuation of International Application No. PCT/CN2022/074647, filed on Jan. 28, 2022, the entire content of which is incorporated herein by reference.

TECHNICAL FIELD

The present application relates to the field of lithium battery technologies, and in particular, to a lithium-ion battery, a battery module, a battery pack, and a power consumption apparatus.

BACKGROUND

In recent years, with the wider application of lithium-ion batteries, the lithium-ion batteries are widely applied to energy storage power systems, such as hydraulic power, thermal power, wind power and solar power plants, as well as many fields, such as electric tools, electric bicycles, electric motorcycles, electric vehicles, military equipment and aerospace. Due to the great development of the lithium-ion batteries, higher requirements are put forward for their energy density, cycle performance, safety performance and the like.

During the cycle of the lithium-ion batteries, lithium may be deposited on a surface of a negative electrode current collector due to nonuniformity of current density and the concentration of lithium ions in an electrolytic solution, fast deposition may occur at some sites during the deposition, and then sharp lithium dendrite structures are formed, and may penetrate a separator when lithium dendrites grow to a certain extent, causing safety issues. In addition, when growing to a certain extent, the lithium dendrites may fracture to form "dead lithium", causing a loss of battery capacity and resulting in problems of poor cycle performance, short service life and poor safety performance of the batteries. Therefore, there is a need to adopt certain strategies to optimize negative electrodes of the lithium-ion batteries, thereby improving the safety of the lithium-ion batteries and improving energy density and cycle stability of the batteries.

SUMMARY

The present application is made in view of the foregoing problems, the objective is to provide a lithium-ion battery capable of effectively reducing the formation of lithium dendrites and having high energy density and improved cycle stability and safety, and to provide a battery module, a battery pack, and a power consumption apparatus including the lithium-ion battery of the present application.

In order to achieve the foregoing objective, in a first aspect of the present application, a lithium-ion battery is provided, where a ratio of a discharge negative electrode capacity to a discharge positive electrode capacity of the lithium-ion battery is less than 1 (that is, Nd/Pd<1), the lithium-ion battery includes a laminated composite negative electrode, and the negative electrode includes a current collector as well as a lithiophilic layer, a main body layer and a lithiophobic layer that are provided upward in sequence along the current collector.

In any embodiment, a material of the lithiophilic layer contains a doped and modified carbon material, the carbon material is at least one of artificial graphite, natural graphite, carbon nanotubes, carbon fibers, meso-carbon microbeads, graphene, and graphene oxide, a doping element in the doped and modified carbon material is at least one of O, N, S, B, P, F, Cl, Br and I, and an amount of the doping element is 0.2-2 wt. %, or in some embodiments 0.8-1.5 wt. %, calculated based on a weight of the doped and modified carbon material.

In any embodiment, a material of the main body layer contains at least one of natural graphite, artificial graphite, meso-carbon microbeads, soft carbon, and hard carbon.

In any embodiment, a material of the lithiophobic layer contains a carbon material without functional groups or defects, and the carbon material is at least one of artificial graphite, natural graphite, carbon nanotubes, carbon fibers, meso-carbon microbeads, and graphene.

In any embodiment, a thickness of the lithiophilic layer is 0.2-15 μm, in some embodiments 2-10 μm, or in some embodiments 5-8 μm.

In any embodiment, a thickness of the main body layer is 80-200 μm, in some embodiments 100-180 μm, or in some embodiments 120-150 μm.

In any embodiment, the lithium-ion battery according to claim 1 or 2 is characterized in that a thickness of the lithiophobic layer is 0.2-15 μm, or in some embodiments 2-10 μm.

Therefore, according to the present application, on one hand, a ratio of a discharge negative electrode capacity to a discharge positive electrode capacity is less than 1 (that is, Nd/Pd<1) through the overall design of a battery, thereby improving energy density of the battery; and on the other hand, a negative electrode in the battery is provided with a lithiophilic layer, a main body layer and a lithiophobic layer that are provided upward in sequence along a current collector, thereby effectively reducing the influence of current density of a working surface of the negative electrode, inhibiting the growth of lithium dendrites, and greatly improving the cycle life and safety of a lithium metal battery.

In a second aspect of the present application, a battery module is provided, including the lithium-ion battery in the first aspect of the present application.

In a third aspect of the present application, a battery pack is provided, including the battery module in the second aspect of the present application.

In a fourth aspect of the present application, a power consumption apparatus is provided, including at least one selected from the lithium-ion battery in the first aspect of the present application, the battery module in the second aspect of the present application or the battery pack in the third aspect of the present application.

The battery module, the battery pack, and the power consumption apparatus of the present application include the lithium-ion battery provided in the present application, and thus have at least the same advantages as the lithium-ion battery.

DESCRIPTION OF REFERENCE SIGNS

Figure 1:
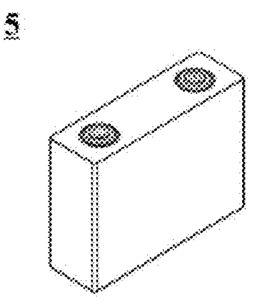
FIG. 1 is a schematic diagram of a lithium-ion battery according to an embodiment of the present application.

1 battery pack; 2 upper box body; 3 lower box body; 4 battery module; 5 secondary battery; 51 housing; 52 electrode assembly; 53 top cover assembly.

DESCRIPTION OF EMBODIMENTS

Embodiments that specifically disclose a lithium-ion battery, a battery module, a battery pack and an electrical apparatus of the present application will be described below in detail with reference to the accompanying drawings as appropriate. However, unnecessarily detailed descriptions may be omitted in some cases. For example, detailed description for a well-known matter and repeated description for a practically identical structures are omitted. This is done to avoid unnecessarily redundant descriptions for ease of understanding by persons skilled in the art. In addition, the drawings and the following description are provided for persons skilled in the art to fully appreciate the present application, and are not intended to limit the subject matters described in the claims.

A "range" disclosed herein is defined in the form of a lower limit and an upper limit. A given range is defined by selecting a lower limit and an upper limit, and the selected lower limit and upper limit define a boundary of a particular range. The range defined in this manner may or may not include end values, and may be combined arbitrarily, that is, any lower limit may be combined with any upper limit to form a range. For example, if ranges of 60-120 and are listed for a particular parameter, it is understood that ranges of 60-110 and 80-120 are also contemplated. In addition, if the minimum range values listed are 1 and 2, and the maximum range values listed are 3, 4 and 5, all the following ranges are contemplated: 1-3, 1-4, 1-5, 2-3, 2-4, and 2-5. In the present application, unless otherwise specified, a numerical range "a-b" represents an abbreviated representation of any combination of real numbers between a and b, where both a and b are real numbers. For example, a numerical range "0-5" means that all real numbers between "0-5" have been listed herein, and "0-5" is just an abbreviated representation of a combination of these numerical values. In addition, when a certain parameter is expressed as an integer ≥2, it is equivalent to disclosing that the parameter is, for example, an integer of 2, 3, 4, 5, 6, 7, 8, 9, 10, 11, 12, or the like.

Unless otherwise specified, all embodiments and optional embodiments of the present application may be combined with each other to form a new technical solution.

Unless otherwise specified, all technical features and optional technical features of the present application may be combined with each other to form a new technical solution.

Unless otherwise specified, all steps of the present application may be performed sequentially or randomly, but in some embodiments, performed sequentially. For example, a method includes steps (a) and (b), which means that the method may include steps (a) and (b) performed sequentially, or steps (b) and (a) performed sequentially. For example, the method mentioned may further include step (c), which means that step (c) may be added to the method in any order, for example, the method may include steps (a), (b) and (c), steps (a), (c) and (b), steps (c), (a) and (b), or the like.

Unless otherwise specified, "comprising" and "containing" mentioned in the present application are open-ended. For example, the "comprising" and "containing" may mean that other components that are not listed may or may not further be comprised or contained.

Unless otherwise specified, in the present application, the term "or" is inclusive. For example, the phrase "A or B" means "A, B or both A and B". More particularly, a condition "A or B" is satisfied by any one of the following: A is true (or present) and B is false (or not present); A is false (or not present) and B is true (or present); or both A and B are true (or present). In this disclosure, the phrases "at least one of A, B, and C" and "at least one of A, B, or C" both mean only A, only B, only C, or any combination of A, B, and C.

In order to improve energy density of a lithium-ion battery, it is needed to increase a voltage and a capacity of a positive active substance material in the battery as much as possible, and to reduce a voltage of a negative active substance material and increase a capacity thereof as much as possible. During the cycle of the lithium-ion battery, lithium may be deposited on a surface of a negative electrode current collector due to nonuniformity of current density and the concentration of lithium ions in an electrolytic solution, fast deposition may occur at some sites during the deposition, and then sharp lithium dendrite structures are formed, and may penetrate a separator when lithium dendrites grow to a certain extent, causing safety issues. In addition, when growing to a certain extent, the lithium dendrites may fracture to form "dead lithium", causing a loss of battery capacity and resulting in problems of poor cycle performance, short service life and poor safety performance of the battery.

For the foregoing problems, the present application provides a lithium-ion battery, where a ratio of a discharge negative electrode capacity to a discharge positive electrode capacity of the lithium-ion battery is less than 1 (that is, $Nd/Pd<1$), the lithium-ion battery includes a laminated composite negative electrode, and the negative electrode includes a current collector as well as a lithiophilic layer, a main body layer and a lithiophobic layer that are provided upward in sequence along the current collector.

According to the present application, on one hand, a ratio of a discharge negative electrode capacity to a discharge positive electrode capacity is less than 1 (that is, $Nd/Pd<1$) through the overall design of a lithium-ion battery, thereby improving energy density of the battery; and on the other hand, a negative electrode in the battery is provided with a lithiophilic layer, a main body layer and a lithiophobic layer that are provided upward in sequence along a current collector, a) the lithiophilic layer can induce lithium ions to be deposited toward a direction of the current collector, which reduces nucleation overpotential of lithium metal on the electrode and avoids irregular accumulation of lithium on a surface, b) the main body layer can adaptively provide storage space for the lithium ions and can adapt to the volume change during charging and discharging, and its high specific surface area can reduce the current density, and c) the lithiophobic layer can effectively improve electronic conductivity of a surface of an electrode sheet, so that the surface current density is more uniform, and diffusion of the lithium ions is promoted. Therefore, the lithium-ion battery with the above negative electrode effectively avoids the growth of dendrites, and greatly improves the energy density and cycle life of the lithium-ion battery.

[Negative Electrode Sheet]

The lithium-ion battery of the present application includes a laminated composite negative electrode, and the negative electrode includes a current collector as well as a lithiophilic layer, a main body layer and a lithiophobic layer that are provided upward in sequence along the current collector.

In some embodiments, a material of the lithiophilic layer contains a doped and modified carbon material, the carbon material is at least one of artificial graphite, natural graphite, carbon nanotubes, carbon fibers, meso-carbon microbeads, graphene, and graphene oxide, a doping element in the doped and modified carbon material is at least one of O, N, S, B, P, F, Cl, Br and I, and an amount of the doping element is 0.5-2 wt. %, or in some embodiments 0.8-1.5 wt. %, calculated based on a weight of the doped and modified carbon material. In some embodiments, the material of the lithiophilic layer is O-doped and modified artificial graphite, N-doped and modified graphene oxide, or P-doped and modified carbon nanotubes, and an amount of the element doped therein is 0.8-1.5 wt. %. In the present application, the amount of the doping element in the doped and modified carbon material can be obtained based on the types of the doping element and the carbon material through detection means, such as an X-ray energy spectrometer (EDS), X-ray photoelectron spectroscopy (XPS) or an X-ray fluorescence spectrometer (XRF). An amount of the doped and modified carbon material is greater than 97 wt. %, calculated based on the total weight of the material of the lithiophilic layer. The lithiophilic layer formed by the doped and modified carbon material can effectively improve conductivity of the negative electrode, so that the current density of a surface of an electrode sheet is more uniform, and thus lithium ions can evenly disperse in the negative electrode; and the modified carbon material contains functional groups with strong electronegativity, which can enhance lithiophilicity of the negative electrode, thereby inducing the lithium ions to be deposited toward a direction of the current collector.

In some embodiments, the lithiophilic layer further optionally contains a binder. The binder may be at least one selected from styrene-butadiene rubber (SBR), polyacrylic acid (PAA), polyacrylate sodium (PAAS), polyacrylamide (PAM), polyvinyl alcohol (PVA), sodium alginate (SA), polymethacrylic acid (PMAA), and carboxymethyl chitosan (CMCS).

In some embodiments, the lithiophilic layer further optionally contains a conductive agent. The conductive agent may be at least one selected from superconducting carbon, acetylene black, carbon black, Ketjen black, carbon dots, carbon nanotubes, graphene, and carbon nanofibers.

In some embodiments, the lithiophilic layer further optionally contains another additive, such as a thickener (for example, sodium carboxymethyl cellulose (CMC-Na)).

In some embodiments, a material of the main body layer contains at least one of natural graphite, artificial graphite, meso-carbon microbeads, soft carbon, and hard carbon, and an amount thereof is greater than 97 wt. %, calculated based on the total weight of the material of the main body layer. The main body layer can provide a certain storage space for the lithium ions deintercalacted from a positive electrode, so that the lithium ions are deposited in the main body material effectively and evenly, thereby reducing the deposition of lithium metal on the surface of the negative electrode sheet and avoiding the formation of lithium dendrites.

In some embodiments, the main body layer further optionally contains a binder. The binder may be at least one selected from styrene-butadiene rubber (SBR), polyacrylic acid (PAA), polyacrylate sodium (PAAS), polyacrylamide (PAM), polyvinyl alcohol (PVA), sodium alginate (SA), polymethacrylic acid (PMAA), and carboxymethyl chitosan (CMCS).

In some embodiments, the main body layer further optionally contains a conductive agent. The conductive agent may be at least one selected from superconducting carbon, acetylene black, carbon black, Ketjen black, carbon dots, carbon nanotubes, graphene, and carbon nanofibers.

In some embodiments, the main body layer further optionally contains another additive, such as a thickener (for example, sodium carboxymethyl cellulose (CMC-Na)).

In some embodiments, a material of the lithiophobic layer contains a carbon material without functional groups or defects, and the carbon material is at least one of artificial graphite, natural graphite, carbon nanotubes, carbon fibers, meso-carbon microbeads, and graphene. An amount of the carbon material without functional groups or defects is greater than 97 wt. %, calculated based on the total weight of the material of the lithiophobic layer. The carbon material without functional groups or defects has poor compatibility with lithium metal, and the lithiophobic layer formed by the carbon material without functional groups or defects can effectively improve electronic conductivity of the surface of the electrode sheet, so that the surface current density is more uniform, and diffusion of the lithium ions to the main body layer is promoted.

In some embodiments, the lithiophobic layer further optionally contains a binder. The binder may be at least one selected from styrene-butadiene rubber (SBR), polyacrylic acid (PAA), polyacrylate sodium (PAAS), polyacrylamide (PAM), polyvinyl alcohol (PVA), sodium alginate (SA), polymethacrylic acid (PMAA), and carboxymethyl chitosan (CMCS).

In some embodiments, the lithiophobic layer further optionally contains a conductive agent. The conductive agent may be at least one selected from superconducting carbon, acetylene black, carbon black, Ketjen black, carbon dots, carbon nanotubes, graphene, and carbon nanofibers.

In some embodiments, the lithiophobic layer further optionally contains another additive, such as a thickener (for example, sodium carboxymethyl cellulose (CMC-Na)).

In some embodiments, a thickness of the lithiophilic layer is 0.2-15 μm. In some embodiments, the thickness of the lithiophilic layer is 2-10 μm. In some embodiments, the thickness of the lithiophilic layer is 5-8 μm. If the thickness of the lithiophilic layer is less than 0.2 μm, the lithium ions cannot be effectively induced to be deposited toward the direction of the current collector; and if the thickness of the lithiophilic layer is greater than 15 μm, the overall energy density of the battery is reduced.

In some embodiments, a thickness of the main body layer is 80-200 μm. In some embodiments, the thickness of the main body layer is 100-180 μm. In some embodiments, the thickness of the main body layer is 120-150 μm.

In some embodiments, a thickness of the lithiophobic layer is 0.2-15 μm. In some embodiments, the thickness of the lithiophilic layer is 2-10 μm. If the thickness of the lithiophobic layer is less than 0.2 μm, the lithium ions cannot be effectively promoted to diffuse toward the main body layer, causing that the cycle performance of the battery becomes poor; and if the thickness of the lithiophobic layer is greater than 15 μm, the overall energy density of the battery is reduced.

In some embodiments, the negative electrode current collector may be metal foil or a composite current collector. For example, as the metal foil, copper foil may be used. The composite current collector may include a polymer material base layer and a metal layer formed on at least one surface of the polymer material substrate. The composite current collector may be formed by synthesizing a metal material (copper, copper alloy, nickel, nickel alloy, titanium, titanium alloy, silver, silver alloy, or the like) on the polymer material substrate (such as a substrate of polypropylene (PP), polyethylene glycol terephthalate (PET), polybutylene terephthalate (PBT), polystyrene (PS), polyethylene (PE), or the like).

The negative electrode provided in the present application can be prepared using a method including the following steps:

(1) fully stirring and mixing a doped and modified carbon material, a conductive agent, an binder and any other component in an appropriate amount of deionized water in a certain weight ratio to form a uniform lithiophilic layer slurry, and coating the lithiophilic layer slurry on a surface of a negative electrode current collector as a lithiophilic layer;

(2) fully stirring and mixing a carbon material of a main body layer, a conductive agent, an binder and any other component in an appropriate amount of deionized water in a certain weight ratio to form a uniform main body layer slurry, and coating the main body layer slurry on a surface of the lithiophilic layer as a main body layer;

(3) fully stirring and mixing a carbon material without functional groups or defects, a conductive agent, an binder and any other component in an appropriate amount of deionized water in a certain weight ratio to form a uniform lithiophobic layer slurry, and coating the lithiophobic layer slurry on a surface of the main body layer as a lithiophobic layer; and (4) obtaining a negative electrode sheet after drying and cold pressing the above electrode sheet.

Typically, in addition to the above negative electrode provided in the present application, the lithium-ion battery further includes a positive electrode sheet, an electrolyte, and a separator. During charging and discharging of the battery, active ions are intercalated and deintercalated back and forth between the positive electrode sheet and the negative electrode sheet. The electrolyte plays the role of conducting ions between the positive electrode sheet and the negative electrode sheet. The separator is provided between the positive electrode sheet and the negative electrode sheet, and mainly plays the role of preventing a short circuit between positive and negative electrodes while allowing the ions to pass.

[Positive Electrode Sheet]

A positive electrode sheet includes a positive electrode current collector and a positive film layer provided on at least one surface of the positive electrode current collector, and the positive film layer includes the positive active material in the first aspect of the present application.

As an example, the positive electrode current collector has two surfaces opposite in its own thickness direction, and the positive film layer is provided on either or both of the two opposite surfaces of the positive electrode current collector.

In some embodiments, the positive electrode current collector may be metal foil or a composite current collector. For example, as the metal foil, aluminum foil may be used. The composite current collector may include a polymer material base layer and a metal layer formed on at least one surface of the polymer material base layer. The composite current collector may be formed by synthesizing a metal material (aluminum, aluminum alloy, nickel, nickel alloy, titanium, titanium alloy, silver and silver alloy, or the like) on a polymer material substrate (such as a substrate of polypropylene (PP), polyethylene glycol terephthalate (PET), polybutylene terephthalate (PBT), polystyrene (PS), polyethylene (PE), or the like).

In some embodiments, the positive active material may be a positive active material for a battery well-known in the art. As an example, the positive active material may include at least one of the following materials: a lithium-containing phosphate of an olivine structure, a lithium transition metal oxide, and their respective modified compounds. However, the present application is not limited to these materials, and other conventional materials that may be used as the positive active material of the battery may also be used. These positive active materials may be used alone, or two or more types may be used in combination. Examples of the lithium transition metal oxide may include, but are not limited to, at least one of a lithium cobalt oxide (such as $LiCoO_2$), a lithium nickel oxide (such as $LiNiO_2$), a lithium manganese oxide (such as $LiMnO_2$, $LiMn_2O_4$), a lithium nickel cobalt oxide, a lithium manganese cobalt oxide, a lithium nickel manganese oxide, a lithium nickel cobalt manganese oxide (such as $LiNi_{1/3}Co_{1/3}Mn_{1/3}O_2$ (or referred to as $NCM_{333}$ for short), $LiNi_{0.5}Co_{0.2}Mn_{0.3}O_2$ (or referred to as $NCM_{523}$ for short), $LiNi_{0.5}Co_{0.25}Mn_{0.25}O_2$ (or referred to as $NCM_{211}$ for short), $LiNi_{0.6}Co_{0.2}Mn_{0.2}O_2$ (or referred to as $NCM_{622}$ for short), $LiNi_{0.8}Co_{0.1}Mn_{0.1}O_2$ (or referred to as $NCM_{811}$ for short), a lithium nickel cobalt aluminum oxide (such as $LiNi_{0.85}Co_{0.15}Al_{0.05}O_2$), their modified compounds, and the like. Examples of the lithium-containing phosphate of the olivine structure may include, but are not limited to, at least one of lithium iron phosphate (such as $LiFePO_4$ (or referred to as LFP for short)), a composite of lithium iron phosphate and carbon, lithium manganese phosphate (such as $LiMnPO_4$), a composite of lithium manganese phosphate and carbon, lithium manganese iron phosphate, and a composite of lithium manganese iron phosphate and carbon.

In some embodiments, the positive film layer further optionally includes a binder. As an example, the binder may include at least one of a polyvinylidene fluoride (PVDF), a polytetrafluoroethylene (PTFE), a vinylidene fluoride-tetrafluoroethylene-propylene terpolymer, a vinylidene fluoride-hexafluoropropylene-tetrafluoroethylene terpolymer, a tetrafluoroethylene-hexafluoropropylene copolymer and fluorine-containing acrylate resin.

In some embodiments, the positive film layer further optionally includes a conductive agent. As an example, the conductive agent may include at least one of superconducting carbon, acetylene black, carbon black, Ketjen black, carbon dots, carbon nanotubes, graphene, and carbon nanofibers.

In some embodiments, the positive electrode sheet may be prepared by the following means: dispersing the foregoing components for preparing a positive electrode sheet, such as the positive active material, the conductive agent, the binder and any other components, in a solvent (such as N-methylpyrrolidone) to form a positive electrode slurry; and coating the positive electrode slurry on a positive electrode current collector, and obtaining the positive electrode sheet after processes of drying, cold pressing, and the like.

[Electrolyte]

An electrolyte plays the role of conducting ions between a positive electrode sheet and a negative electrode sheet. The type of the electrolyte is not specifically limited in the present application, and can be selected according to needs. For example, the electrolyte may be liquid, gel or all solid.

In some embodiments, the electrolyte is an electrolytic solution. The electrolytic solution includes an electrolyte salt and a solvent.

In some embodiments, the electrolyte salt may be at least one selected from lithium hexafluorophosphate, lithium tetrafluoroborate, lithium perchlorate, lithium hexafluorarsenate, lithium bisfluorosulfonimide, lithium bistrifluoromethanesulfonimidate, lithium trifluoromethanesulfonate, lithium difluorophosphate, lithium difluorooxalateborate, lithium bisoxalateborate, lithium difluorobisoxalate phosphate and lithium tetrafluorooxalate phosphate.

In some embodiments, the solvent may be at least one selected from ethylene carbonate, propylene carbonate, ethyl methyl carbonate, diethyl carbonate, dimethyl carbonate, dipropyl carbonate, methyl propyl carbonate, ethylene propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, methyl ethyl sulfone and diethyl sulfone.

In some embodiments, the electrolytic solution further optionally includes an additive. For example, the additive may include a negative electrode film-forming additive, or a positive electrode film-forming additive, or may further include an additive that can improve specific performance of the battery, such as, an additive for improving overcharge performance of the battery, or an additive for improving high-temperature performance or low-temperature performance of the battery.

[Separator]

In some embodiments, the secondary battery further includes a separator. The type of the separator is not particularly limited in the present application, and any well-known porous-structure separator with good chemical stability and mechanical stability can be selected.

In some embodiments, the material of the separator may be at least one selected from glass fiber, nonwoven fabric, polyethylene, polypropylene and polyvinylidene fluoride. The separator may be a single-layered thin film or a multi-layered composite thin film, which is not particularly limited. When the separator is a multi-layered composite thin film, the material of each layer can be the same or different, which is not particularly limited.

In some embodiments, the positive electrode sheet, the negative electrode sheet and the separator may be subject to a winding process or a lamination process, to obtain an electrode assembly.

In some embodiments, the secondary battery may include an outer package. The outer package may be used to package the foregoing electrode assembly and electrolyte.

In some embodiments, the outer package of the secondary battery may be a hard shell such as a hard plastic shell, an aluminum shell, or a steel shell. The outer package of the secondary battery may be a soft package, such as a soft bag. A material of the soft package may be plastic, for example, polypropylene, polybutylene terephthalate, polybutylene succinate.

In addition, the lithium-ion battery, the battery module, the battery pack, and the power consumption apparatus of the present application will be described below with reference to the accompanying drawings as appropriate.

The present application has no particular limitation on the shape of the secondary battery, which may be cylindrical, square, or in any other shape. For example, FIG. 1 is a secondary battery 5 in a square structure as an example.

Figure 2:
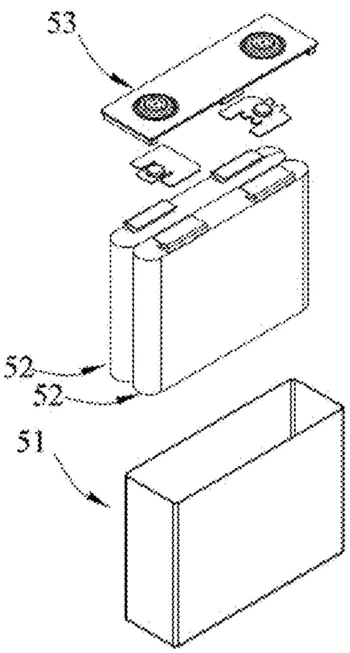
FIG. 2 is an exploded view of the lithium-ion battery according to the embodiment of the present application shown in FIG. 1.

In some embodiments, with reference to FIG. 2, the outer package may include a housing 51 and a cover plate 53. The housing 51 may include a base plate and side plates connected to the base plate. The base plate and the side plates are enclosed to form an accommodating chamber. The housing 51 has an opening that is in communication with the accommodating chamber, and the cover plate 53 can cover the opening to close the accommodating chamber. A positive electrode sheet, a negative electrode sheet, and a separator may be subject to a winding process or a lamination process to form an electrode assembly 52. The electrode assembly 52 is packaged in the accommodating chamber. The electrolytic solution is infiltrated in the electrode assembly 52. The number of electrode assemblies 52 included in the secondary battery 5 may be one or more, which can be selected by persons skilled in the art according to specific actual needs.

In some embodiments, secondary batteries may be assembled into a battery module, the number of secondary batteries included in the battery module may be one or more, and the specific number may be selected by persons skilled in the art according to application and capacity of the battery module.

Figure 3:
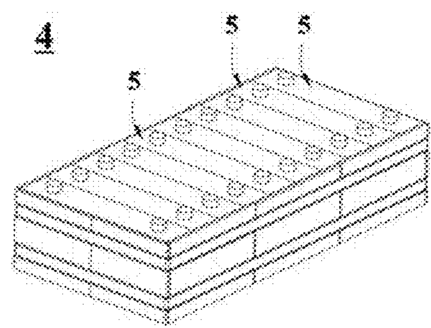
FIG. 3 is a schematic diagram of a battery module according to an embodiment of the present application.

FIG. 3 is a battery module 4 as an example. With reference to FIG. 3, in the battery module 4, a plurality of secondary batteries 5 may be sequentially arranged along a length direction of the battery module 4. Certainly, they may be arranged in any other manner. Further, the plurality of secondary batteries 5 may be fixed with fasteners.

Optionally, the battery module 4 may further include a shell with an accommodating space, and the plurality of secondary batteries 5 are accommodated in the accommodating space.

In some embodiments, the foregoing battery modules may be further assembled into a battery pack, and the number of battery modules included in the battery pack may be one or more, and the specific number may be selected by persons skilled in the art according to application and capacity of the battery pack.

Figure 4:
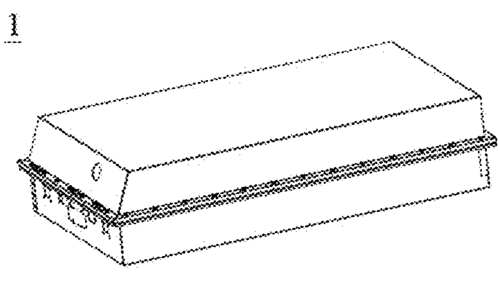
FIG. 4 is a schematic diagram of a battery pack according to an embodiment of the present application.
Figure 5:
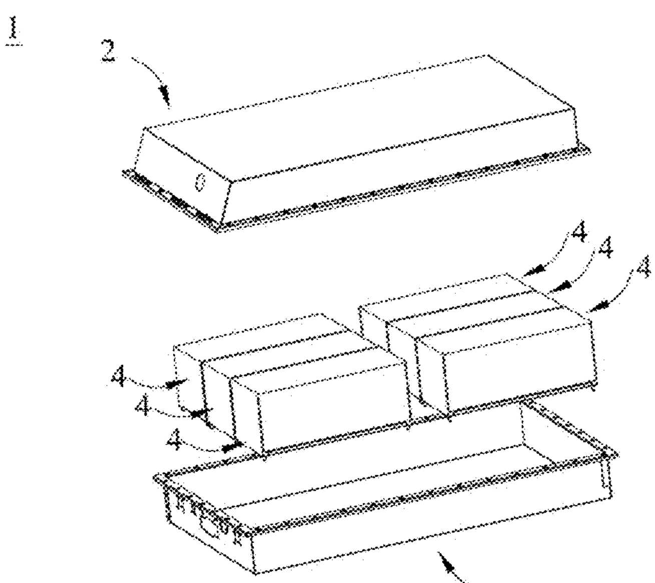
FIG. 5 is an exploded view of the battery pack according to the embodiment of the present application shown in FIG. 4.

FIG. 4 and FIG. 5 are a battery pack 1 as an example. With reference to FIG. 4 and FIG. 5, the battery pack 1 may include a battery box and a plurality of battery modules 4 disposed in the battery box. The battery box includes an upper box body 2 and a lower box body 3. The upper box body 2 can cover the lower box body 3 and form an enclosed space for accommodating the battery modules 4. The plurality of battery modules 4 may be arranged in the battery box in any manner.

In addition, the present application further provides a power consumption apparatus including at least one of the secondary battery, the battery module, or the battery pack provided in the present application. The secondary battery, the battery module, or the battery pack can be used as a power source of the power consumption apparatus, or as an energy storage unit of the power consumption apparatus. The power consumption apparatus may include a mobile device (for example, a mobile phone or a notebook computer), an electric vehicle (for example, a full electric vehicle, a hybrid electric vehicle, a plug-in hybrid electric vehicle, an electric bicycle, an electric scooter, an electric golf cart, or an electric truck), an electric train, a ship and satellite, an energy storage system, and the like, but is not limited thereto.

As the power consumption apparatus, a secondary battery, a battery module, or a battery pack may be selected according to usage requirements.

Figure 6:
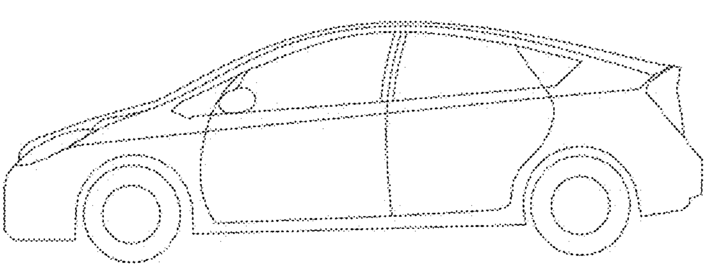
FIG. 6 is a schematic diagram of a power consumption apparatus in which a secondary battery is used as a power source according to an embodiment of the present application.

FIG. 6 is a power consumption apparatus as an example. The power consumption apparatus is a full electric vehicle, a hybrid electric vehicle, a plug-in hybrid electric vehicle, or the like. To meet a requirement of the power consumption apparatus for high power and high energy density of a secondary battery, a battery pack or a battery module may be used.

In another example, the apparatus may be a mobile phone, a tablet computer, a notebook computer, or the like. The apparatus usually requires lightness and thinness, and a secondary battery may be used as a power source.

EMBODIMENTS

Embodiments of the present application will be described hereinafter. The embodiments described below are exemplary and merely used to explain the present application, and may not be understood as limitation to the present application. Where specific techniques or conditions are not specified in the embodiments, they are performed according to techniques or conditions described in the literature in the art or according to product specifications. The reagents or instruments used without specifying the manufacturer are conventional products that can be obtained from the market.

I. Raw Materials

- Graphene (purchased from Guangdong Kaijin New Energy Technology Co., Ltd)
- Carbon nanotubes (purchased from Guangdong Kaijin New Energy Technology Co., Ltd)
- Graphene oxide (the amount of 0 doped is 0.95 wt. %, calculated based on the weight of graphene oxide, purchased from Qingdao Lianchuang Lida Graphite Co., Ltd)
- Natural graphite (purchased from Qingdao Lianchuang Lida Graphite Co., Ltd)
- Artificial graphite (purchased from Qingdao Lianchuang Lida Graphite Co., Ltd)
- Meso-carbon microbeads (purchased from Guangdong Kaijin New Energy Technology Co., Ltd)
- Carbon black (purchased from Guangdong Kaijin New Energy Technology Co., Ltd)
- Styrene-butadiene rubber (SBR, CAS: 9003-55-8, purchased from Shanghai Aladdin Biochemical Technology Co., Ltd)
- Sodium carboxymethyl cellulose (CMC-Na, 9004-32-4, purchased from Shanghai Aladdin Biochemical Technology Co., Ltd)
- Lithium nickel cobalt manganese oxide ($LiNi_{0.5}Co_{0.2}Mn_{0.3}O_2$, $NCM_{523}$, purchased from Ningbo Jinhe New Material Co., Ltd)
- Polyvinylidene fluoride (PVDF, CAS: 24937-79-9, purchased from Shanghai Aladdin Biochemical Technology Co., Ltd)
- N-methylpyrrolidone (NMP, CAS: 872-50-4, purchased from Shanghai Aladdin Biochemical Technology Co., Ltd)
- Ethylene carbonate (EC, CAS: 96-49-1, purchased from Shanghai Macklin Biochemical Co., Ltd)
- Ethyl methyl carbonate (EMC, CAS: 623-53-0, purchased from Shanghai Macklin Biochemical Co., Ltd)
- Diethyl carbonate (DEC, CAS: 105-58-8, purchased from Shanghai Macklin Biochemical Co., Ltd)
- Lithium hexafluorophosphate ($LiPF_6$, CAS: 21324-40-3, purchased from Guangzhou Tinci High-Tech Materials Co., Ltd)

II. Preparation of Doped and Modified Carbon Material

1. Preparation of O-Doped and Modified Artificial Graphite 1 g of artificial graphite was added to 400 mL of concentrated sulfuric acid and concentrated phosphoric acid (a volume ratio of 9:1) in an ice bath, and 6 g of potassium permanganate was added slowly and stirred in the ice bath for 30 minutes for reaction at 50° C. for 8 hours. Then, 1 mL of hydrogen peroxide with a concentration of 30% was slowly added in the ice bath for reaction for 20 minutes, and finally the product was centrifugally washed several times to pH=7. The amount of 0 in the obtained modified artificial graphite was 1.35 wt. %, calculated based on the weight of the modified artificial graphite.

2. Preparation of N-Doped and Modified Graphene Oxide

Graphene oxide was placed in a furnace body for reaction for 2 hours at 400° C. in an atmosphere of ammonia gas (with purity of 99%). The amount of N in the obtained modified graphene oxide was 1.23 wt. %, calculated based on the weight of the modified graphene oxide.

3. Preparation of P-Doped and Modified Carbon Nanotubes

Carbon nanotubes, phosphoric acid and water were mixed for reaction for 2 hours at 400° C. in an inert atmosphere, and then the product was dried. The amount of P in the obtained modified carbon nanotubes was 1.28 wt. %, calculated based on the weight of the modified carbon nanotubes.

I. Production of Lithium-Ion Battery

Embodiment 1

[Negative Electrode Sheet]

(1) Preparation of Lithiophilic Layer

The o-doped and modified artificial graphite, the N-doped and modified graphene oxide, a conductive agent of carbon black, and a binder of styrene-butadiene rubber were fully stirred and mixed in an appropriate amount of deionized water in a weight ratio of 73:24:0.5:2.5 to form a uniform lithiophilic layer slurry. Then, the lithiophilic layer slurry was coated on one surface of a negative electrode current collector of copper foil to obtain a lithiophilic layer, and the thickness of the lithiophilic layer was 5 μm.

(2) Preparation of Main Body Layer

Artificial graphite, a conductive agent of carbon black, a binder of styrene-butadiene rubber, and a thickener of sodium carboxymethyl cellulose were fully stirred and mixed in an appropriate amount of deionized water in a weight ratio of 97:0.5:1.25:1.25 to form a uniform main body layer slurry. Then, the main body layer slurry was coated on a surface of the above lithiophilic layer to obtain a main body layer, and the thickness of the main body layer was 120 μm.

(3) Preparation of Lithiophobic Layer

Artificial graphite without any defect, a conductive agent of carbon black, and a binder of styrene-butadiene rubber were fully stirred and mixed in an appropriate amount of deionized water in a weight ratio of 97:0.5:2.5 to form a uniform lithiophobic layer slurry. Then, the lithiophobic layer slurry was coated on a surface of the above main body layer to obtain a lithiophobic layer, and the thickness of the lithiophobic layer was 5 μm.

A negative electrode sheet was obtained after drying and cold pressing the above electrode sheet.

[Positive Electrode Sheet]

A positive active substance of $LiNi_{0.5}Co_{0.2}Mn_{0.3}O_2$ ($NCM_{523}$), a conductive agent of carbon black, and an binder of polyvinylidene fluoride (PVDF) were fully stirred and mixed in an appropriate amount of N-methylpyrrolidone (NMP) in a weight ratio of 97:1:2 to form a uniform positive electrode slurry. The positive electrode slurry was coated on a surface of a positive electrode current collector of aluminium foil, and a positive electrode sheet was obtained after drying and cold pressing.

[Electrolytic Solution]

Ethylene carbonate (EC), ethyl methyl carbonate (EMC) and diethyl carbonate (DEC) were mixed in a volume ratio of 1:1:1, and then $LiPF_6$ was uniformly dissolved in the above solution to obtain an electrolytic solution, where a concentration of $LiPF_6$ was 1 mol/L.

[Separator]

A separator was purchased from Cellgard Company with a model of cellgard 2400.

[Production of Lithium-Ion Battery]

The positive electrode sheet, the separator, and the negative electrode sheet were stacked in order, so that the separator was placed between the positive and negative electrode sheets as a means of isolation, and then they were wound to obtain a jelly roll; and the jelly roll with a capacity of 4.3 Ah was placed in outer packaging foil, 8.6 g of the above prepared electrolytic solution was injected in a dried battery, and a lithium-ion battery in which a ratio of a discharge negative electrode capacity to a discharge positive electrode capacity was 0.7 was obtained after processes of vacuum packaging, standing, chemical conversion, shaping, and the like.

Embodiment 2

Others were the same as Embodiment 1 except that the lithiophilic layer slurry was formed by the O-doped and modified artificial graphite, the P-doped and modified carbon nanotubes, the conductive agent of carbon black, and the binder of styrene-butadiene rubber in the weight ratio of 73:24:0.5:2.5.

Embodiment 3

Others were the same as Embodiment 1 except that the lithiophilic layer slurry was formed by the O-doped and modified artificial graphite, graphene oxide, the conductive agent of carbon black, and the binder of styrene-butadiene rubber in the weight ratio of 73:24:0.5:2.5.

Embodiments 4-18 and Comparative Examples 1-3

Embodiments 4-18 were produced in a manner similar to Embodiment 3, and the corresponding ratio of the discharge negative electrode capacity to the discharge positive electrode capacity and thicknesses and materials of the lithiophilic layer, the main layer, and the lithiophobic layer are shown in Table 1. Similarly, the lithium-ion batteries in Comparative Examples 1-3 were produced in a manner similar to Embodiment 3, and the corresponding ratio of the discharge negative electrode capacity to the discharge positive electrode capacity and thicknesses and materials of the lithiophilic layer, the main layer, and the lithiophobic layer are shown in Table 2.

II. Tests on Performance of Lithium-Ion Battery (1) Energy Density Test of Battery At 25° C., a secondary battery was charged to 4.3 V at a constant current of ⅓ C, then charged to 0.05 C at a constant voltage of 4.3V, and after standing for 5 minutes, discharged to 2.8V at a constant current of ⅓ C, and the discharge energy of the battery was recorded at this moment. The discharge energy of the battery divided by the weight of the battery is weight energy density of the battery with a unit of Wh/kg. Measurement data are shown in Table 1 and Table 2.

(2) Cycle Life Test of Battery

At 25° C., charging and discharging tests were performed on the lithium-ion batteries of all embodiments and comparative examples. A charge-discharge cycle process was as follows: a lithium battery was charged to 4.25V at a constant current of 1 C, then charged to a current of 0.05 C at a constant voltage of 4.25V, and after standing for 5 minutes, discharged to 2.5V at a constant current of 1 C, the capacity of the battery at this moment was denoted as C1, and the above was a charge-discharge cycle of the battery. Cycles were performed according to the above process until the capacity is attenuated to 80% of the first cycle, and the number of cycles at this moment was recorded as the cycle life of the battery. Measurement data are shown in Table 1 and Table 2.

TABLE 1

Related parameters and performance of the lithium-ion batteries of the present application

| Embodiment sequence number | Nd/Pd | Lithiophilic layer Material | Lithiophilic layer Thickness (μm) | Main body layer Material | Main body layer Thickness (μm) | Lithiophobic layer Material | Lithiophobic layer Thickness (μm) | Battery performance Energy density (Wh/kg) | Battery performance Cycle life |
|---|---|---|---|---|---|---|---|---|---|
| 1 | 0.7 | O-doped and modified artificial graphite and N-doped and modified graphene oxide | 5 | Natural graphite | 120 | Artificial graphite | 5 | 338 | 1456 |
| 2 | 0.7 | O-doped and modified artificial graphite and P-doped and modified carbon nanotubes | 5 | Natural graphite | 120 | Artificial graphite | 5 | 338 | 1520 |
| 3 | 0.7 | O-doped and modified artificial graphite and graphene oxide | 5 | Artificial graphite | 120 | Artificial graphite | 5 | 345 | 1600 |
| 4 | 0.7 | O-doped and modified artificial graphite and graphene oxide | 5 | Meso-carbon microbeads | 120 | Artificial graphite | 5 | 320 | 910 |
| 5 | 0.7 | O-doped and modified artificial graphite and graphene oxide | 5 | Natural graphite | 120 | Artificial graphite | 5 | 338 | 1400 |

TABLE 1-continued

Related parameters and performance of the lithium-ion batteries of the present application

| Embodiment sequence number | Nd/Pd | Lithiophilic layer Material | Lithiophilic layer Thickness (μm) | Main body layer Material | Main body layer Thickness (μm) | Lithiophobic layer Material | Lithiophobic layer Thickness (μm) | Battery performance Energy density (Wh/kg) | Battery performance Cycle life |
|---|---|---|---|---|---|---|---|---|---|
| 6 | 0.7 | O-doped and modified artificial graphite and graphene oxide | 5 | Natural graphite | 120 | Carbon nanotubes | 5 | 342 | 1580 |
| 7 | 0.7 | O-doped and modified artificial graphite and graphene oxide | 5 | Natural graphite | 120 | Graphene | 5 | 340 | 1450 |
| 8 | 0.7 | O-doped and modified artificial graphite and graphene oxide | 0.2 | Natural graphite | 120 | Artificial graphite | 5 | 340 | 920 |
| 9 | 0.7 | O-doped and modified artificial graphite and graphene oxide | 2 | Natural graphite | 120 | Artificial graphite | 5 | 342 | 1240 |
| 10 | 0.7 | O-doped and modified artificial graphite and graphene oxide | 10 | Natural graphite | 120 | Artificial graphite | 5 | 344 | 1340 |
| 11 | 0.7 | O-doped and modified artificial graphite and graphene oxide | 15 | Natural graphite | 120 | Artificial graphite | 5 | 346 | 1320 |
| 12 | 0.7 | O-doped and modified artificial graphite and graphene oxide | 5 | Natural graphite | 80 | Artificial graphite | 5 | 300 | 1580 |
| 13 | 0.7 | O-doped and modified artificial graphite and graphene oxide | 5 | Natural graphite | 100 | Artificial graphite | 5 | 310 | 1508 |
| 14 | 0.7 | O-doped and modified artificial graphite and graphene oxide | 5 | Natural graphite | 200 | Artificial graphite | 5 | 342 | 1350 |
| 15 | 0.7 | O-doped and modified artificial graphite and graphene oxide | 5 | Natural graphite | 120 | Artificial graphite | 0.2 | 342 | 1300 |
| 16 | 0.7 | O-doped and modified artificial graphite and graphene oxide | 5 | Natural graphite | 120 | Artificial graphite | 2 | 340 | 1492 |
| 17 | 0.7 | O-doped and modified artificial graphite and graphene oxide | 5 | Natural graphite | 120 | Artificial graphite | 10 | 334 | 1510 |
| 18 | 0.7 | O-doped and modified artificial graphite and graphene oxide | 5 | Natural graphite | 120 | Artificial graphite | 15 | 330 | 1500 |

TABLE 2

Related parameters and performance of the lithium-ion batteries of comparative examples

| Comparative example sequence number | Nd/Pd | Lithiophilic layer Material | Lithiophilic layer Thickness (μm) | Main body layer Material | Main body layer Thickness (μm) | Lithiophobic layer Material | Lithiophobic layer Thickness (μm) | Battery performance Energy density (Wh/kg) | Battery performance Cycle life |
|---|---|---|---|---|---|---|---|---|---|
| 1 | 1 | — | — | Natural graphite | 120 | — | — | 270 | 1500 |
| 2 | 0.7 | — | — | Natural graphite | 120 | — | — | 340 | 800 |
| 3 | 1 | O-doped and modified artificial graphite and graphene oxide | 5 | Natural graphite | 120 | Artificial graphite | 5 | 270 | 1600 |

It can be seen from the above content that, compared with Comparative Examples 1-3, Embodiments 1-18 of the present application are designed such that Nd/Pd<1 and the lithiophilic layer, the main body layer and the lithiophobic layer are provided upward along the negative electrode current collector, to induce lithium ions to be deposited toward the direction of the current collector, the lithiophobic layer improves electronic conductivity of a surface of an electrode sheet and promotes diffusion of the lithium ions, so that the obtained lithium-ion battery has significantly better energy density and cycle life.

It should be noted that the present application is not limited to the foregoing embodiments. The foregoing embodiments are merely examples, and embodiments having substantially the same constitution as the technical idea and exerting the same effects within the technical solution of the present application are all included within the technical scope of the present application. In addition, various modifications may be made to the embodiments by persons skilled in the art without departing from the spirit and scope of the present application, and other embodiments that are constructed by combining some of the constituent elements of the embodiments are also included in the scope of the present application.

What is claimed is:

1. A lithium-ion battery, comprising:

a negative electrode, comprising a current collector, a lithiophilic layer, a main body layer, and a lithiophobic layer laminated in sequence;

wherein:

a ratio of a discharge negative electrode capacity to a discharge positive electrode capacity of the lithium-ion battery is less than 1;

a material of the lithiophilic layer comprises a doped and modified carbon material;

the carbon material is at least one of artificial graphite, natural graphite, carbon nanotubes, carbon fibers, meso-carbon microbeads, graphene, and graphene oxide;

a doping element in the doped and modified carbon material is at least one of O, N, S, B, P, F, Cl, Br, and I; and an amount of the doping element is 0.2-2 wt. %, calculated based on a weight of the doped and modified carbon material.

2. The lithium-ion battery according to claim 1, wherein a material of the main body layer comprises at least one of natural graphite, artificial graphite, meso-carbon microbeads, soft carbon, or hard carbon.

3. The lithium-ion battery according to claim 1, wherein a material of the lithiophobic layer comprises a carbon material without functional groups or defects, and the carbon material is at least one of artificial graphite, natural graphite, carbon nanotubes, carbon fibers, meso-carbon microbeads, and graphene.

4. The lithium-ion battery according to claim 1, wherein a thickness of the lithiophilic layer is in a range of 0.2-15 μm.

5. The lithium-ion battery according to claim 1, wherein a thickness of the main body layer is in a range of 80-200 μm.

6. The lithium-ion battery according to claim 1, wherein a thickness of the lithiophobic layer is in a range of 0.2-15 μm.

7. A battery module, comprising the lithium-ion battery according to claim 1.

8. A battery pack, comprising the battery module according to claim 7.

9. A power consumption apparatus, comprising the lithium-ion battery according to claim 1.

* * * * *